Aug. 15, 1933.   W. P. MUTHER   1,922,107
MEASURING INSTRUMENT
Filed March 24, 1930   2 Sheets-Sheet 2
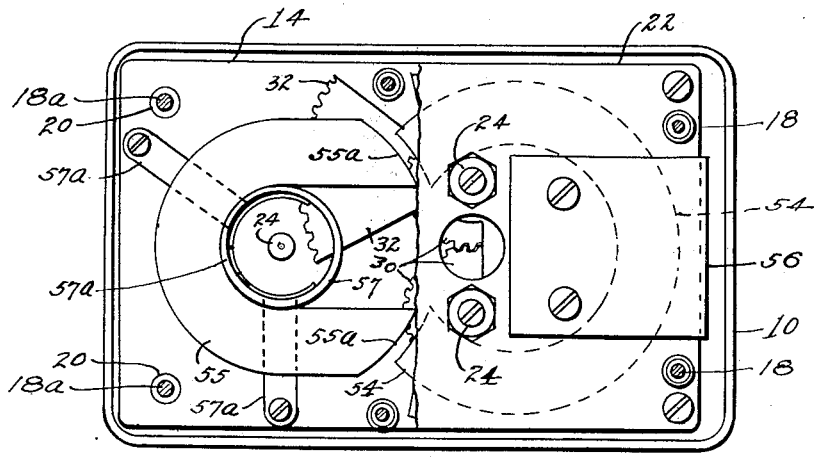
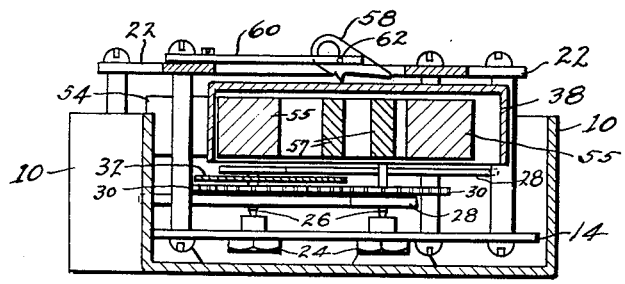
Walter P. Muther
INVENTOR.
BY Harry Dexter Peck
ATTORNEY Patented Aug. 15, 1933

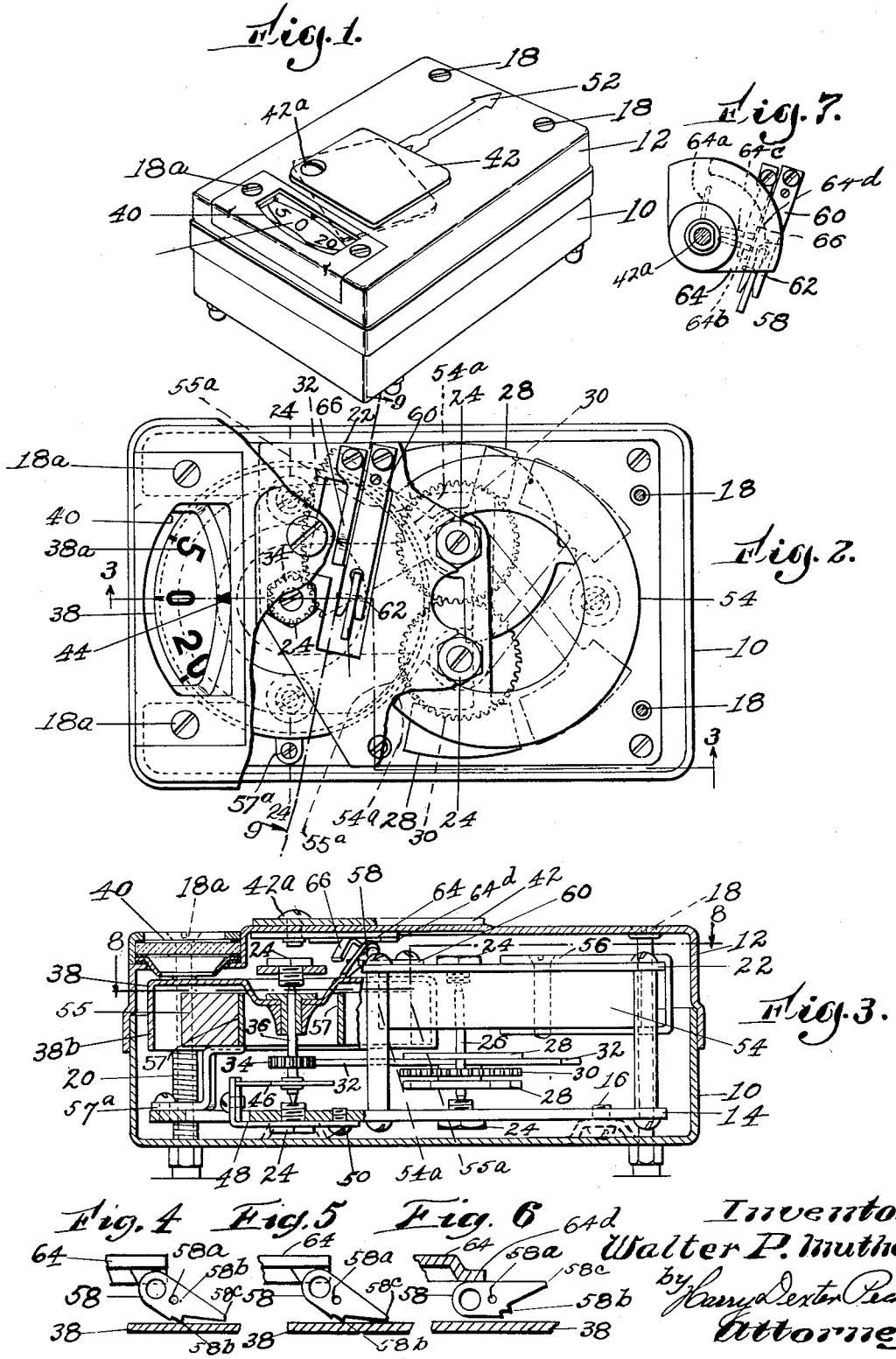

1,922,107

UNITED STATES PATENT OFFICE 1,922,107

MEASURING INSTRUMENT

Walter P. Muther, Wellesley, Mass., assignor to Muther Manufacturing Company, Boston, Mass., a Corporation of Massachusetts Application March 24, 1930. Serial No. 438,380

3 Claims. (Cl. 116—116)

This invention relates to improvements in measuring instruments. More especially it has to do with an instrument capable of measuring the acceleration or deceleration of a moving body, and in particular relates to improved means affecting the operation of such an instrument.

The type of device to which the present improvements are particularly directed is shown in Letters Patent #1,630,833 granted May 31, 1927 to Charles F. Cowdrey and also in Letters Patent #1,712,055 granted May 7, 1929 to Edward R. Smith. This device is primarily adapted to be carried by a moving body and comprises a pair of weighted levers so mounted and arranged that their reaction to inertia is transmitted to a rotating dial whose readings indicate the acceleration or deceleration of the moving body. The device has proven most useful in checking the efficiency of brakes and when so employed, the dial may be graduated in terms of the distance through which a body traveling at a certain velocity would move from the time the brakes are applied until it is brought to rest. For example, when used in connection with an automobile dial graduations are chosen to indicate the number of feet required to bring to a stop a vehicle traveling at the rate of twenty miles an hour when the brakes are applied. In the type of instrument disclosed in the aforesaid patents, it has been necessary either to observe the swing of the dial or else determine some fixed number of feet within which the vehicle should stop if its brakes are acting efficiently and set the dial initially at this number. In the latter case, if the dial does not move it may safely be assumed that the brakes are inefficient, and if it does move, that the brakes are efficient, although one cannot tell whether they are acting with unnecessary excessive pressure or not. If so, there is undue wear on the brake linings and in case of emergency a sudden and too powerful application of the brakes may result in a locking of wheels with consequent danger of skidding or sliding. A more accurate determination of the brake efficiency should be obtained by watching the movement of the dial from zero to its maximum swing, but this has been difficult to do because of the tendency of the dial to oscillate. This will occur in spite of means heretofore provided to dampen or check these oscillations, and so a reading taken under such conditions is at best not entirely satisfactory. Moreover when the instruments as heretofore constructed have been employed, it has been necessary to have one person drive the car and apply the brakes and another to watch the instrument.

It is an object of the present invention to provide an automatic brake or latch which will allow substantially free movement of the dial in one direction, but will lock it against movement in the opposite direction. As a result, when the instrument is used to check the efficiency of the brakes of an automobile the dial will swing as far as the force of inertia compels it to and then be caught and held by the latch against any return. The latch positively prevents any oscillations of the dial. Moreover, since the indicating position of the dial is thus established automatically only one person is necessary to make the test because the instrument can be set to operate and then all that is required is to drive the car at the prescribed velocity and apply the brakes. After the car has been stopped, the driver can then read the dial and see just how many feet were required in which to bring the car to rest. It is a feature of the invention that when the instrument is being set, the latch can be entirely disengaged, it being associated with the cover plate of the dial in such manner that when the latter is nearly swung toward wide open position, it will free the latch from the dial and allow the latter to swing in either direction. This is important because in setting the instrument, it must be positioned horizontally and this is most easily effected by tilting it one way or the other until the dial reading is at zero.

It is also an object of this invention to provide improved dampening means so that when the latch acts to stop the movement of the indicating member or dial, its position at that time will have been reached primarily because of the force of inertia acting because of the change in velocity of the vehicle. That is, if no means were provided, the levers would swing initially because of the potential inertia due to their moving with the vehicle, but when once this force had acted and started the levers rotating their swing would be amplified by the kinetic inertia due to their own movement about their respective axes. It is accordingly the purpose of the dampening means to counteract or offset this effect of the kinetic inertia, and, as herein shown, is accomplished by providing two U-shaped magnets, one inside the dial and the other outside of it, with their opposite poles adjacent one another. Between those poles, and thus through the two magnetic fields established, a depending flange on the dial moves with consequent dampening effect that is markedly superior to any such effect heretofore attained.

It is intended that the patent shall cover by suitable expression in the appended claims whatever features of patentable novelty exist in the invention disclosed.

In the accompanying drawings:

Figure 1 is a perspective of the instrument with the cover plate open and the dial at zero reading;

Figure 2 is a plan view with part of the cover, and with part of the frame plate cut away;

Figure 3 is an elevation in section through the instrument as on line 3—3 of Figure 2;

Figures 4, 5 and 6 are views showing the operative relations of the latch and the dial and cam plate;

Figure 7 is a plan of the latch and detent and their operating cam-plate;

Figure 8 is a plan view or section on line 8—8 of Fig. 3, with the dial and its connected shaft removed; and Figure 9 is an elevation in section on line 9—9 of Figure 2.

Referring more particularly to the drawings, the instrument comprises a casing having a base portion 10 and a cover portion 12. The former is attached to the base plate 14 of the frame by screws 16, and the cover of the casing is adjustably secured to the base portion 10 by four bolts 18 and 18a, those at the dial end being surrounded by coiled spring sleeves 20 which enable the cover to be easily adjusted, as will appear more particularly later herein. The upper and lower frame plates, 22 and 14 respectively, are held in fixed relation to one another and carry a series of adjustable bearings 24. Between the latter are pivoted two vertical shafts 26, on each of which is secured a weighted lever 28 and a gear 30. The latter intermesh and thus insure simultaneous movement of the levers and a combined transmission of their swing to a gear segment 32 attached to one of the vertical shafts 26. This segment meshes with a pinion 34 on a third vertical shaft 36 which carries the dial 38. The latter is cupped at its center, has a depending flange 38b, and on its annular face is marked with suitable graduations 38a. The markings shown in the drawings representing the feet through which a vehicle, traveling at a velocity of twenty miles an hour, would move from the time the brakes are applied until the vehicle is at rest. A window 40 in one end of the top cover permits a portion of these graduations to be seen when its pivoted cover plate 42 is swung open as seen in Figure 1.

When placed horizontally, the weighted levers are in the positions represented by full and dotted lines in Figure 2, each being close by the vertical shaft of the other, and the zero graduation of the dial being opposite the index pointer 44. These respective positions are assured by a hair spring 46 attached to shaft 36 and clamped to the arm of a segment bracket 48 pivotally mounted on one of the bearings 24. This segment can be adjusted, and then fixed in position by the clamp screw 50, to obtain any desired force of the hair spring 46.

If the instrument is used to check the acceleration of a body, the dial will be set in the lead, in which case the levers, under the force of inertia, will swing rearward. When used to check deceleration, or brake efficiency, the instrument is set with the arrow 52 pointing in the direction of travel. Since the levers are close by their vertical shafts when the vehicle is at rest, they will tend to swing against these shafts as the speed of the car increases. But when the brakes are applied and the speed of the car is decelerated, the force of inertia swings the levers forward in accordance with the rate of deceleration to some such positions as those indicated by dot and dash lines in Fig. 2. This movement of the levers will cause rotation of the dial clockwise.

Since the frictional resistance of the bearings 24 on the shafts 26 and 36 is substantially negligible and since the force of hair spring 46 is not great, the levers and dial would rotate unduly unless their swing be dampened. This is accomplished by two U-shaped magnets 54 and 55, one (54) being clamped by a yoke plate 56 to the upper frame plate 22 outside the dial and with its poles 54a close by the depending flange 38b. The other magnet 55 is supported by an internal sleeve 57 having brackets 57a on the lower plate 14, within the hollow of the dial with its poles 55a adjacent the poles of magnet 54. Since opposite poles of these two magnets are opposed to one another there is established two fields of magnetic lines of force through both of which the flange on the dial must pass. The consequent magnetic influence on the dial is most effective in counterbalancing the kinetic inertia which is created when the levers and dial are set in motion. As a result the actual travel or swing of the dial is substantially only that caused by the action of inertia resulting from the sudden change of velocity of the vehicle. Accordingly if the movement of the dial is arrested when at the end of its initial swing, the reading will correctly indicate the efficiency of the brakes.

The invention provides for this desired stopping of the dial by mounting a latch 58 in such manner that no appreciable resistance is offered thereby to the swing of the dial in one direction, but an immediate and locking grip is applied as the dial starts to move reversely.

This latch is in the form of a plate having a hole 58a close by its center of gravity indicated by the dot 58b in Figure 4. A rigid supporting arm 60 extends from the upper plate 22 over the dial, and has an axle 62 across the slot of its forked end. This axle passes somewhat loosely through the hole 58a in the latch 58, the latter being mounted with its center of gravity close by the axle on the side thereof in the direction the dial is moving as it turns clockwise. This causes the small tooth 58b on the lower edge of the latch to rest lightly on the dial as seen in Figure 4. Since the latch is so nearly balanced on its axle, the pressure of the tooth 58b on the dial is negligible, and thus the clockwise movement of the dial is free so far as the latch is concerned. Upon the dial attempting to move reversely, however, the latch turns slightly about its axle, and its tooth 58b, being almost under the axle, is pressed firmly on the dial and locks it fast. The forward point 58c of the latch swings into contact with the dial so as to prevent the tooth 58b from being swung past the axle. This locking position of the latch is illustrated in Figure 5.

From the foregoing it is clear that when the swing of the dial, due to the application of the brakes in the case of a vehicle, is completed the latch locks the dial in the foremost position of swing and will hold it there so that the observer can accurately read the indicated dial graduation. Since the locking of the dial occurs automatically, the driver of the car can also take the reading of the dial after he has brought the car to rest. Thus the invention enables one of the persons heretofore necessary, to be dispensed with if desired.

To again set the dial, the window cover plate 42 is turned slightly toward closed position, that is to the position shown in dotted outline in Figure 1. This simultaneously moves a cam plate 64 secured to the shaft 42a of the cover plate. This cam plate has three slots in its under surface adapted to co-act with a spring detent 66 mounted on plate 22. When the detent is engaged in slot 64a, the cover plate is yieldingly held closed over the window 40. When the detent is in slot 64b, the cover plate is similarly held in wide open position shown in full lines in Figure 1. And when the detent is held in slot 64c, the cover plate is slightly turned from wide open position toward closed position, but not far enough to obscure the index arrow 44 on the dial readings. When so positioned as illustrated by dotted outline in Figure 1 a depressed cam face 64d on the under side of the cam plate is engaged with the upper end of the latch as shown in Figure 6. This tipping of the latch lifts both its point 58c and its tooth 58b entirely clear of the dial and allows the latter to swing freely in either direction.

As earlier mentioned, the clamping screws 18 at the dial end of the casing are surrounded by spring sleeves 20. These sleeves constantly urge the upper and lower portions 10 and 12 of the casing apart at their dial ends. The opposite ends are more securely held by the other screws 18 but not so tightly but what the dial ends of the casing portions can be adjusted by tightening or loosening their screws 18a, thus bringing the cam plate 64 into proper position with respect to the latch 58.

The improved dampening means which cause the dial to be rotated in accordance with the inertia effect due to the change in velocity of the vehicle, together with the latch which locks the dial at the end of its initial movement, make the instrument exceedingly accurate and enables it to give a true reading automatically. It is to be understood that the locking effect achieved by the latch disclosed is in the nature of a wedging action effective only in one direction. Because of this the tendency of the dial to move against the resistance offered by the latch actually locks the dial all the more firmly, while swing in the reverse direction instantly and completely nullifies the locking effect.

I claim:
1. An instrument for indicating the rate of change of velocity of a moving body comprising a casing; a weighted lever pivotally mounted within the casing and adapted to be turned by the force of inertia; a dial operatively connected with said lever so as to rotate in accordance with the swing thereof; and a latch within the casing arranged to permit rotation of said dial in one direction and to engage said dial and thereby prevent rotation in the reverse direction; the said latch being mounted on a pivot above the surface of said dial with a portion on one side of said pivot resting on said surface and with another portion on the other side of said pivot substantially counterbalancing the first said portion so that the pressure of the first said portion on the dial surface is negligible when the latch is positioned to permit rotation of the dial.

2. In an instrument of the type described, having a rotatable member movable by the force of inertia, and a latch normally resting on said member and adapted to permit rotation thereof in one direction and to prevent rotation thereof in the reverse direction; said latch being pivotally supported close by its center of gravity whereby its pressure while resting on said rotatable member and permitting rotation thereof is negligible, and having a tooth approximately under said pivot arranged to engage said rotating member to lock it against rotation in the reverse direction; there being another portion of said latch adapted to engage the rotating member and thereby prevent the tooth from being moved past said pivot in the direction in which rotation is prevented; and means adapted to be moved manually to swing said latch free from the said member and hold it out of engagement therewith, when rotation in the reverse direction is desired.

3. An instrument for testing the brakes of an automobile comprising a casing having an observation window; a weighted lever swingingly mounted in the casing; an indicator actuated by the movement of the lever to move past the window; a cover for the window rotatably mounted outside the casing; a latch adapted to engage the indicator and lock it against rotation in one direction; and a cam rotated by the movement of said cover arranged to engage said latch and hold it out of contact with said indicator; said cam being so disposed that when the cover is in wide open position, the cam and latch are disengaged.

WALTER P. MUTHER.